| United States Patent [19] | [11] Patent Number: 4,908,394 |
|---|---|
| Casey et al. | [45] Date of Patent: Mar. 13, 1990 |

[54] DIAMINOBENZOATE CATALYTIC CHAIN EXTENDERS

[75] Inventors: Jeremiah P. Casey, Emmaus; Susan M. Clift, North Wales, both of Pa.

[73] Assignee: Air Products and Chemicals, Inc., Allentown, Pa.

[21] Appl. No.: 267,217

[22] Filed: Nov. 4, 1988

Related U.S. Application Data

[63] Continuation-in-part of Ser. No. 75,364, Jul. 20, 1987, abandoned.

[51] Int. Cl.$^4$ .............................................. C08G 18/18
[52] U.S. Cl. ...................................... 521/163; 528/73; 528/85
[58] Field of Search ...................... 521/163; 528/85, 73

[56] References Cited

U.S. PATENT DOCUMENTS

| 3,248,369 | 4/1966 | Weidman et al. | 260/75 |
| 3,630,987 | 12/1971 | Thoma et al. | 260/32.6 |
| 3,794,621 | 2/1974 | Meckel et al. | 260/75 NH |
| 3,839,292 | 10/1974 | Ermidis | 260/75 NH |
| 4,026,840 | 5/1977 | Bechara et al. | 260/2.5 AC |
| 4,039,514 | 8/1977 | Van Gulick | 260/75 NH |
| 4,054,556 | 10/1977 | Van Gulick | 260/75 NH |
| 4,101,470 | 7/1978 | McEntire | 521/118 |
| 4,133,943 | 1/1979 | Blahak | 521/163 |
| 4,222,955 | 9/1980 | Chung et al. | 260/465 E |
| 4,326,042 | 4/1982 | Zimmerman | 521/115 |
| 4,350,778 | 9/1982 | Dominguez et al. | 521/118 |
| 4,482,690 | 11/1984 | Orphanides | 528/64 |
| 4,500,654 | 2/1985 | Carlsen et al. | 521/129 |

*Primary Examiner*—Maurice J. Welsh
*Assistant Examiner*—Rabon Sergent
*Attorney, Agent, or Firm*—Keith D. Gourley; James C. Simmons; William F. Marsh

[57] ABSTRACT

The present invention relates to a process for the production of polyurethanes wherein a tertiary amine functionality is incorporated into the side chain of a diaminobenzoate to form catalytic polyurethane chain extender. These chain extenders are polyurethane catalysts which provide adequate cure without residual odor and safety hazards associated with the more traditional tertiary amine catalysts. When reacted with the isocyanate reactive group the non-tertiary amine portion of the chain extender is bound to the polymeric network thereby preventing diffusion of the catalyst species from the polyurethane and negating odor and toxicity as problems. The diaminobenzoate provides enhanced polyurethane physical properties.

4 Claims, 2 Drawing Sheets

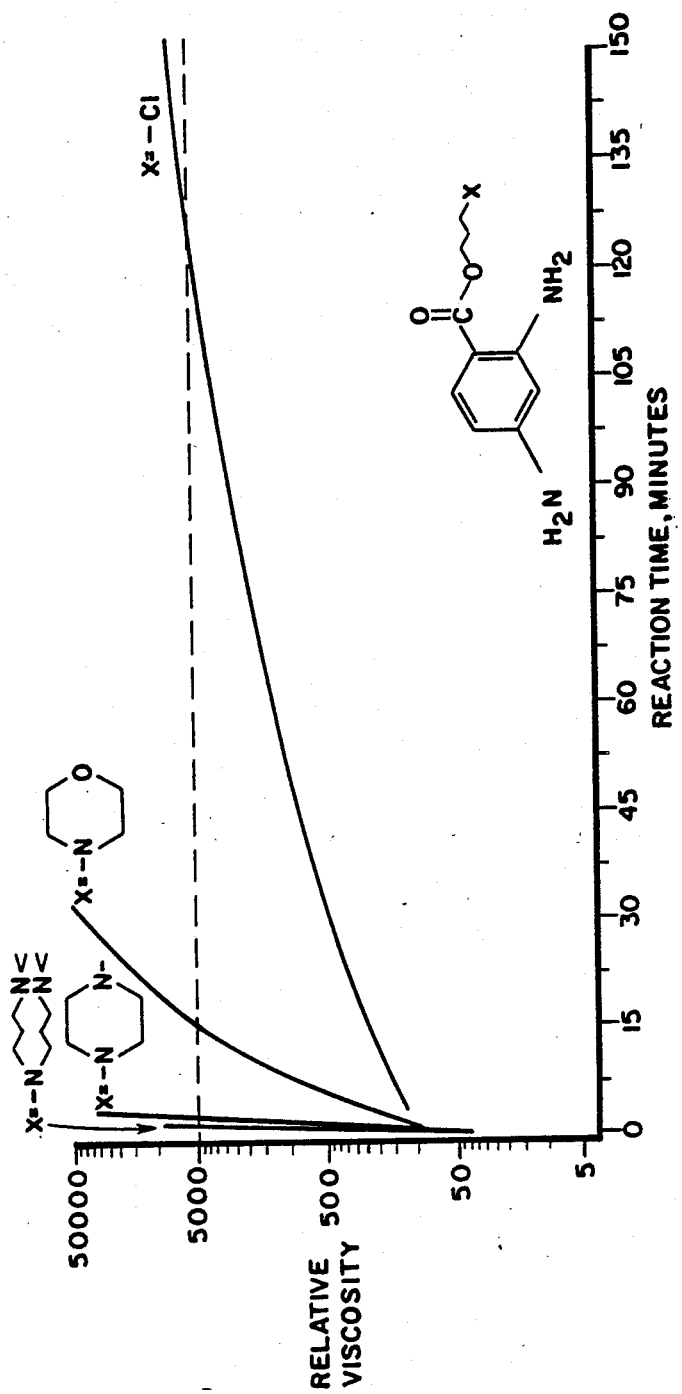

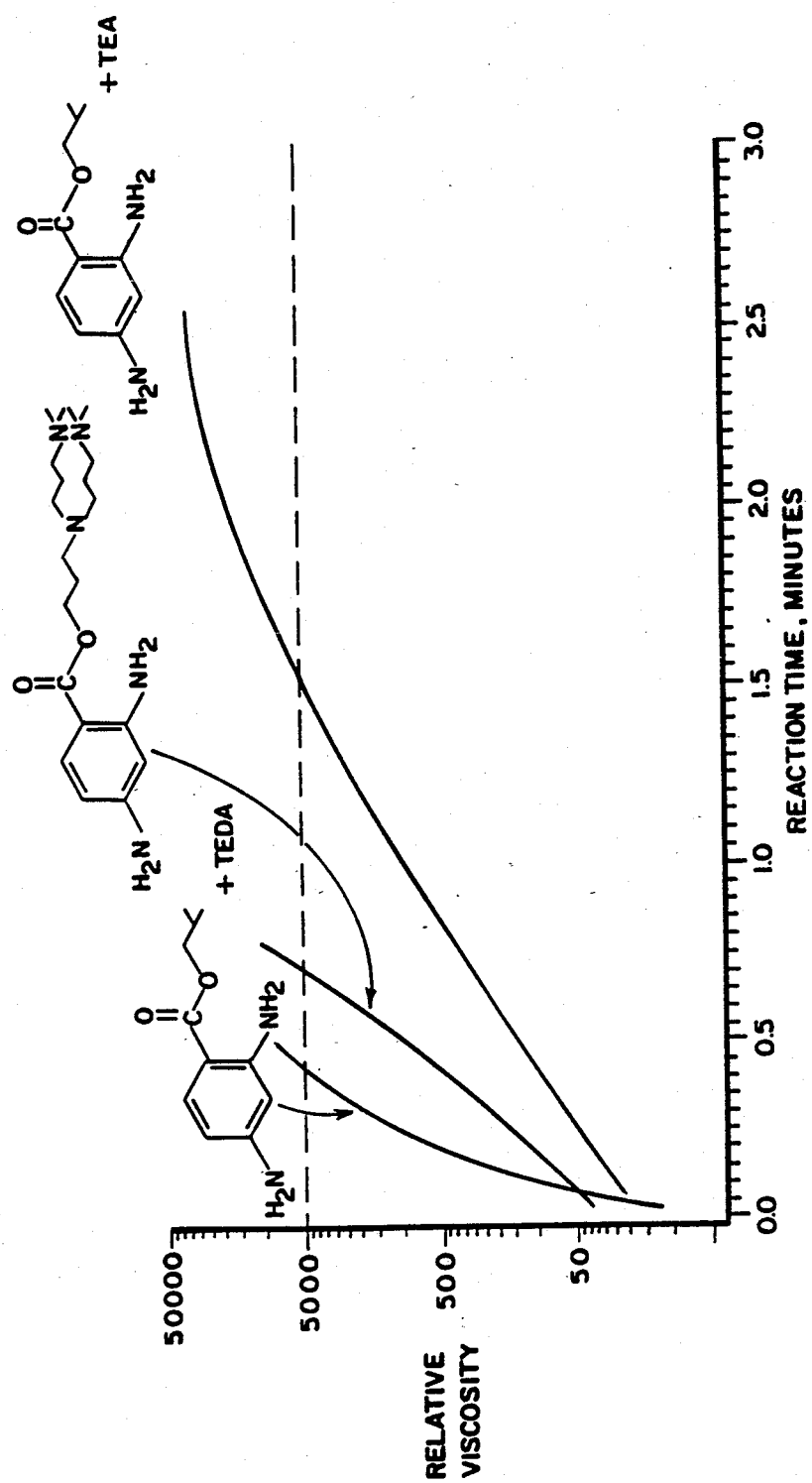

DIAMINOBENZOATE CATALYTIC CHAIN EXTENDERS

This invention is a continuation-in-part of USSN 075,364 having a filing date of July 20, 1987, now abandoned the subject matter which is incorporated by reference.

FIELD OF THE INVENTION

The present invention relates to a process for the preparation of polyurethanes. More specifically, the present invention relates to the use of a tertiary amine derivative of a substituted diaminobenzoate as a catalyst in the preparation of polyurethanes.

BACKGROUND OF THE INVENTION

Several processes are known in the art using either tertiary amine catalysts or diamine chain extenders. The following are among them.

U.S. Pat. No. 3,248,369 discloses a process for production of cross-linked resinous films utilizing a tertiary amine acrylate catalyst which is represented by the formula:

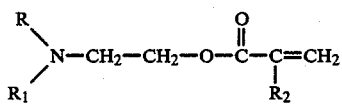

wherein R and $R_1$ are selected from the class consisting of alkyl radicals containing 1–4 carbon atoms and $R_2$ is selected from the group consisting of hydrogen and methyl radical.

U.S. Pat. No. 3,630,987 discloses linear, segmented polyurethane elastomers and filaments therefrom, produced by reaction of NCO prepolymers with equivalent amounts of compounds of the formula:

wherein A is m- or p-phenylene or

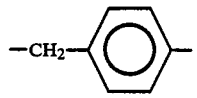

as chain lengthening agents in polar organic solvents.

U.S. Pat. No. 3,794,621 discloses polyurethan elastomers and a method for preparing them wherein the polyurethane elastomers have the structural formulae:

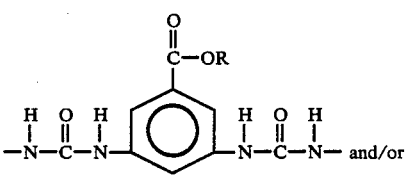

and/or

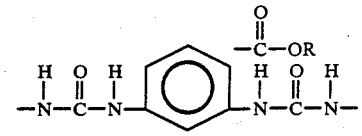

wherein R is an alkyl radical containing from about 1 to 20 carbon atoms which may be branched and which may contain heterto atoms if desired. The disclosed polyurethane elastomers are especially useful in the preparation of moldings which will be subjected to severe mechanical stress such as, for example, rollers.

U.S. Pat. No. 3,839,292 discloses a diamine curative system for polyurethane prepolymers having terminally reactive isocyanate groups comprising 2-cyano-p-phenylene diamine. The prepolymers are prepared by reacting a polymeric diol with a stoichiometric excess of 2,4-toluene diisocyanate, 2-6-toluene diisocyanate or an isomeric mixture containing predominantly the 2,4-isomer.

U.S. Pat. No. 4,026,840 discloses isocyanate reactions such as in their condensation with polyols to form polyurethanes and their polymerization to form polyisocyanurates. These reactions are promoted by certain hydroxyalkyl tertiary amine catalysts corresponding to the formula:

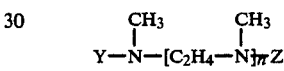

wherein
Y=$CH_3$ or Z
Z=—$CH_2CH_2OH$
n=1 or 2

U.S. Pat. Nos. 4,039,514 and 4,054,556 disclose polyurethane/polyurea compositions comprising the reaction product of an organic diisocyanate, a glycol having a molecular weight of 500–5000 and a derivative of 2,4-diaminobenzoic acid selected from $C_1$–$C_8$ alkyl and substituted alkyl esters, the amide, alkyl substituted amides, the anilide, substituted anilides, the nitrile and mixtures thereof.

U.S. Pat. No. 4,101,470 discloses compounds having the formula:

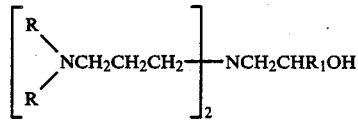

wherein R is a lower alkyl, $R_1$ is selected from the group consisting of hydrogen, alkyl, aryl, substituted aryl, alkaryl, substituted alkaryl, aralkyl, and substituted aralkyl. The patent also discloses a method of producing a polyurethane by utilizing the above compounds as catalysts in the reaction of an organic polyisocyanate with an organic polyester polyol or polyether polyol.

U.S. Pat. No. 4,133,943 discloses an improved process for the production of cellular or non-cellular polyurethane urea elastomers wherein diamines containing ester groups are used as chain lengthening agents. A characteristic feature of the process is the use of salts of aromatic diaminocarboxylic or sulphonic acids as a portion of the chain lengthening component.

U.S. Pat. No. 4,222,955 discloses a process for curing polyurethanes with substituted aromatic diamines. The diamines are individually selected from 3,5-diamino-4-tert-alkylbenzoates, 3,5-diamino-4-tert-alkylbenzonitriles and alkylene bis(3-amino-4-tert-alkylbenzoate).

U.S. Pat. No. 4,326,042 discloses the use of N-methoxypropylmorpholine, N-butylmorpholine and N,N'-dimethylpiperazine together as a catalyst system in an activator solution to give finer, more uniform cells to polyester-based polyurethane foams.

U.S. Pat. No. 4,350,778 discloses a method for making reaction injection molded polyurethane having improved paintability properties. The product is formed by reacting a high molecular weight polyhydric polyether, a low molecular weight active hydrogen-containing compound of at least dual functionality, a polyisocyanate and a catalyst combination comprising N-hydroxypropyl-N',N',N'',N''-tetramethylimino- bispropylamine, dibutyltin dilaurate and an alkyltin mercaptide. This catalyst combination results in improved processing, a minimum of surface defects, excellent green strength and improved paintability using certain paints.

U.S. Pat. No. 4,482,690 discloses a process for the manufacture of polyurethane-urea elastomers formed by reacting the prepolymer of an organic polyisocyanate and a compound having at least two Zerewitenoff active hydrogen atoms with a chain extender comprising t-butylbenzenediamine. The utilization of t-butylbenzenediamine as an aromatic diamine chain extender imparts flexibility to the handling of reactable compositions due to the increase in pot life and imparts excellent tensile modulus to the resulting polymer.

U.S. Pat. No. 4,500,654 discloses a catalyst and process for producing polyurethanes by contacting an organic polyol and an organic isocyanate with a catalyst comprising an N-substituted alkoxyalkylpiperazine and preferably additionally comprising and N-alkoxymorpholine wherein the alkylene moieties of the morpholine and piperazine are independently selected from the group consisting of $C_1$ to about $C_5$ alkylene moieties and wherein the alkoxy moieties are independently selected from the group consisting of $C_1$ to about $C_3$ alkoxy moieties.

SUMMARY OF THE INVENTION

The present invention relates to a catalytic chain extender, the resultant polyurethane formulation utilizing the catalytic chain extender and an improvement to a process for preparing polyurethane. Generally, in a process for the preparation of polyurethane, a polyisocyanate, a polyol, a chain extender and a catalyst are reacted together, either by a one-shot method or by the preparation and subsequent curing of a prepolymer. The improvement of the process of the present invention is the utilization of a catalytic chain extender which comprises a tertiary amine derivative of a diaminobenzoate wherein the tertiary amine functionality provides a catalytic function. The catalytic chain extender utilized in the present invention is represented by the general formula:

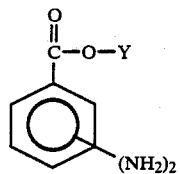

wherein:
Y=

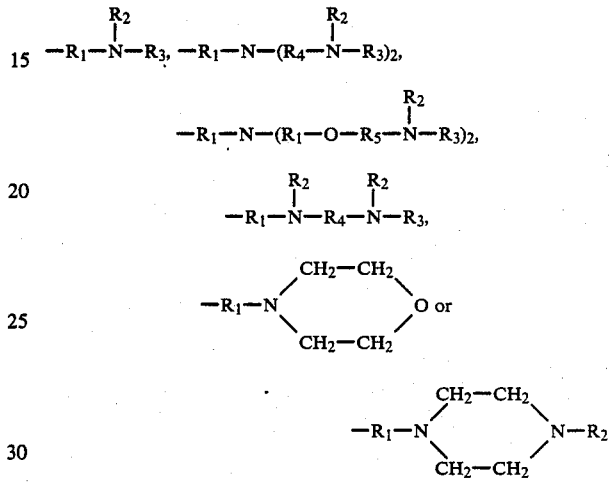

and
$R_1 = (CH_2)_n$, $n = 2-5$
$R_2, R_3, = C_{1-4}$ alkyl or $C_{2-6}$ alkoxyalkyl
$R_4 = C_{3-9}$ alkyl and
$R_5 = C_{1-4}$ alkyl

BRIEF DESCRIPTION OF THE DRAWING

FIG. 1 is a plot of rheological data for four polyurethanes prepared using selected diaminobenzoate catalysts.

FIG. 2 is a plot of rheological data for three polyurethanes prepared using selected chain extenders and a separate tertiary amine catalyst.

DETAILED DESCRIPTION OF THE INVENTION

The use of catalysts in preparing polyurethane by the reaction of polyisocyanate, polyol, and perhaps other ingredients is known in the art. A catalyst employed during the polymerization process must promote the many reactions that must proceed simultaneously and competitively at balanced rates in order to provide polyurethanes with the desired physical properties. One such reaction is between a hydroxyl-containing molecule and an isocyanate to form a urethane. A second reaction is an isocyanate-water reaction by which an isocyanate-terminated molecule is hydrolyzed and $CO_2$ is generated to blow or assist in the blowing of foam, e.g., in the preparation of one shot flexible foams.

Tertiary amines have become well established as catalysts for the production of polyurethane foams. They accelerate both urethane-forming and blowing reactions. However, many amines of this class have a strong odor which is carried over into the polyurethane foam product. Final product odor may be reduced by using volatile catalysts such as N-methylmorpholine, but poor cure often results from too rapid of a loss of catalyst in the foaming process. High volatility usually means low flash-point, high vapor concentration and handling problems. Toxicity of some tertiary amines can also be a problem. Tetramethylbutanediamine, for example, is no longer used in large scale because of its physiological effects, and diethylaminopropionitrile was withdrawn in 1978 when it was found to be neurologically active. Therefore, a need exists for low odor tertiary amine catalysts of low toxicity which will provide adequate cure.

Tertiary amine containing an isocyanate-reactive group which ties the catalyst into the polymer network offer one solution to the problems of odor, toxicity and insufficient cure associated with more traditional amine catalysts. By incorporating the amine into the polymer chain, adequate cure is insured. Also, diffusion of the amine from the foam is prevented which minimizes both the odor and possible health hazards associated with free amine. Examples of catalysts containing one isocyanate-reactive group include dimethylaminoethanol, tetramethyl-1,3-diamino-2-propanol, and 1-(2-hydroxypropyl)imidazole. A major disadvantage of these types of catalysts is their action as chain terminators in the polymer forming reaction. An alternative, catalytic alkoxylated amines containing three or more reactive sites such as triethanolamine or 'quadrol,' a propoxylated ethylenediamine, act as crosslinkers which reduce elastomer or foam flexibility and impact resistance. Tertiary amines containing two isocyanate-reactive groups are often difficult to prepare and isolate in high yield.

Polyurethane elastomers are block copolymers derived from the combination of a polymeric diol, a polyisocyanate, and a chain extending diamine or diol. The resulting copolymer is composed of soft segment blocks and hard segment blocks. The polymeric polyester or polyether comprises the flexible soft segment block which influences the elastic nature of the product and its low temperature performance, while the polyisocyanate/chain extender units constitute the hard segment blocks which affect modulus, hardness and tear strength and determine the upper use temperature.

The hard segment blocks are partially segregated from the soft segment blocks into domains or microdomains. Hydrogen bonding and dipole-dipole interactions between the polar groups provide a pseudo-crosslinked network structure between linear polyurethane chains such that the polymer has the physical characteristics and mechanical behavior of a covalently crosslinked network. Urea linkages which result from the use of diamine chain extenders yield stronger hydrogen bonds than the carbamate linkages obtained by use of diol chain extenders. Consequently, the cohesive strength within the hard segments, and thus, overall polymer strength is greater when diamine chain extenders are utilized. Cast elastomer formulations cured with diamine chain extenders generally do not contain tertiary amine catalysts.

Methylenediphenyldiisocyanate [MDI]/1,4-butanediol cast elastomers or MDI/1,4-butanediol/high molecular weight diol one shot elastomers showing a phase separated structure are often catalyzed. Another widely used polyisocyanate/extender combination is toluene diisocyanate [TDI] and methylene-bis(ortho-chloroaniline) [MoCA], a carcinogenic, high melting solid. Polyester or polyether elastomers utilizing TDI/MoCA exhibit general toughness and excellent wear and tear properties. Alternative aromatic diamine chain extenders can also be used in preparing polyurethane/polyureas wherein the urea hydrogen bonding structure enhances physical properties.

Applications using both an aromatic diamine and a tertiary catalyst may include high resilience foams, semi-rigid foams, and RIM and microcellular elastomers. The use of diamines as chain extenders in the preparation of cast elastomers results in increased strength and load-bearing capabilities of the polymer product without a significant increase in polymer density.

To produce these polyurethanes, a mixture of an organic polyisocyanate, a polyol and perhaps other ingredients is cured with a derivative of an aromatic diamine, preferably a diaminobenzamide. The preparation of the polyurethane can be accomplished by a one-shot mode or by the preparation of a prepolymer and the subsequent curing of the prepolymer.

The organic polyisocyanate used in the preparation may be aromatic, aliphatic and/or cycloaliphatic with an aromatic diisocyanate being preferred. Broadly, $C_8$–$C_{25}$ aromatic and $C_2$–$C_{18}$ aliphatic and $C_5$–$C_{25}$ cycloaliphatic diisocyanates may be utilized. Arylene diisocyanates, i.e., those in which each of the two isocyanate groups is attached directly to an aromatic ring, are preferred. Examples of useful polyisocyanates include toluene-2,4-diisocyanate, 4-methoxy-1,3-phenylenediisocyanate, 4-isopropyl-1,3-phenylenediisocyanate, 4-chloro-1,3-phenylenediisocyanate, 4-butoxy-1,3-phenylenediisocyanate, 2,4-diisocyanatodiphenylether, mesitylene diisocyanate, durylene diisocyanate, 4,4'-methylene-bis(phenylisocyanate), 1,5-naphthalene diisocyanate, p,p'-biphenyl diisocyanate, o-nitro-p,p'-biphenyl diisocyanate, 4,4'-diisocyanatodibenzyl, 1,4-tetramethylene diisocyanate, 1,6-hexamethylene diisocyanate, 1,10-decamethylene diisocyanate, 1,4-cyclohexylene diisocyanate, xylene diisocyanate, 4,4'-methylene-bis(cyclohexylisocyanate), 1,5-tetrahydronaphthalene diisocyanate and m or p-phenylenediisocyanate. Toluene diisocyanate, both 2,4- and mixtures of the 2,4- and 2,6-isomers, is preferred.

As mentioned previously, the polyisocyanate is reacted with polyol. Several different types of polyol may be utilized, for instance, those derived from saturated and unsaturated polyhydrocarbons, polychloroprene, polyformals, polyalkylene ethers, polyesters, etc. Representative polyols include polyethylene ether glycol, polypropylene ether glycol, polytrimethylene ether glycol, polytetramethylene ether glycol, polypentamethylene ether glycol, polydecamethylene ether glycol, and poly-1,2-dimethylethylene ether glycol. Mixtures of two or more polyalkylene ether glycols may be employed if desired. Also, the following polyester glycols may be utilized: Polyester glycols prepared by the polymerization of cyclic lactones such as $\omega$-caprolactone capped with diols or by the condensation polymerization of a dicarboxylic acid or its condensation equivalent and a mlar excess of an organic polyol, representative diacids being succinic, glutaric and adipic acids and representative organic polyols being ethylene glycol, propylene glycol, 1,3-butanediol, 1,4-butanediol, 1,6-hexanediol, neopentyl glycol and mixtures thereof. Adipates of lower alkyl polyols are preferred.

Finally, the curing agent and catalyst is utilized in the preparation of the polyurethane. The key to the present invention is the use of a common curing agent and catalyst which incorporates a tertiary amine functionality into the side chain of a diaminobenzoate to form a catalytic chain extender. Specifically, the diaminobenzoate derivative may be defined as having the general formula:

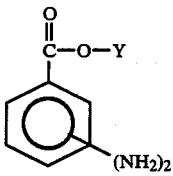

wherein:
Y =

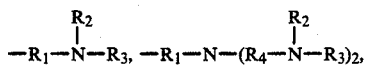

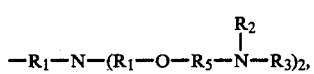

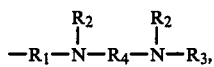

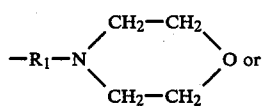

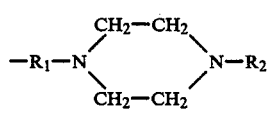

and
$R_1 = (CH_2)_n$, n=2-5
$R_2$, $R_3$, = $C_{1-4}$ alkyl or $C_{2-6}$ alkoxyalkyl
$R_4 = C_{3-9}$ alkyl and
$R_5 = C_{1-4}$ alkyl Specific examples of compounds represented by the generalized formula are:
(3-(morpholino)propyl)-diaminobenzoate
(3-(N-methylpiperazino)propyl)-diaminobenzoate
(3-(bis(N,N-dimethylaminopropyl)amino)propyl)-diaminobenzoate
(2-(morpholino)ethyl)-diaminobenzoate
(2-(N-methylpiperazino)ethyl)-diaminobenzoate
(2-bis(N,N-dimethylaminopropyl)aminoethyl-diaminobenzoate
(3-(dimethylamino)propyl)-diaminobenzoate
(2-(dimethylamino)ethyl)-diaminobenzoate
(3-(diethylamino)propyl)-diaminobenzoate
(3-(di-n-propylamino)propyl)-diaminobenzoate
(2-(di-n-propylamino)ethyl)-diaminobenzoate
(3-(diisopropylamino)propyl)-diaminobenzoate
(2-diisopropylamino)ethyl)-diaminobenzoate
(3-(methylethylamino)propyl)-diaminobenzoate
(2-(methylethylamino)ethyl)-diaminobenzoate
(3-(di-n-butylamino)propyl)-diaminobenzoate
(2-(di-n-butylamino)ethyl)-diaminobenzoate
(3-(methyl-n-propylamino)propyl)-diaminobenzoate
(2-(methyl-n-propylamino)ethyl)-diaminobenzoate
(3-(methylisopropylamino)propyl)-diaminobenzoate
(2-(methylisopropylamino)ethyl)-diaminobenzoate
(3-(methyl-n-butylamino)propyl)-diaminobenzoate
(2-(methyl-n-butylamino)ethyl)-diaminobenzoate
(3-(methyl-sec-butylamino)propyl)-diaminobenzoate
(2-(methyl-sec-butylamino)ethyl)-diamino)benzoate
(3-(ethylisobutylamino)propyl)-diaminobenzoate
(2-(ethylisobutylamino)ethyl)-diaminobenzoate
(3-(dicyclohexylamino)propyl)-diaminobenzoate
(2-(dicyclohexylamino)ethyl)-diaminobenzoate
(3-(N-methylcyclohexylamino)propyl)-diaminobenzoate
(2-(N-methylcyclohexylamino)ethyl)-diaminobenzoate
(3-(N-(2-methoxyethyl)piperazino)propyl)-diaminobenzoate
(3-(N-(2-methoxyethyl)piperazino)ethyl)-diaminobenzoate The diaminobenzoate can be any of the 2,3; 2,4; 2,6; 3,4; or 3,5 isomers.

The following examples are offered to show the efficacy of the present invention.

EXAMPLE 1

Preparation of Catalytic Esters

To a mixture of 106.0 g of 2,4-dinitrobenzoic acid in 200 ml of toluene were added 10.0 g of concentrated sulfuric acid and 95.0 g of 3-chloropropanol. The mixture was refluxed for 4 hrs and the resulting water removed by azeotropic distillation. After this period the mixture was cooled to room temperature and washed with 250 ml of an aqueous 5% NaHCO$_3$ solution followed by two 200 ml water washings. The toluene was removed at reduced pressure to yield 146 g of (3-chloropropyl)-2,4-dinitrobenzoate, mp 40° C.

A two liter autoclave was charged with 142 g of (3-chloropropyl)-2,4-dinitrobenzoate, 1275 ml of toluene and 4.5 g of a 5% palladium on carbon/50% water catalyst. The mixture was hydrogenated at 800 psi hydrogen pressure while maintaining the temperature below 100° C. with cooling. The mixture was cooled and 350 ml of tetrahydrofuran was added to dissolve the solid that had precipitated from the toluene. The resulting solution was filtered to remove the catalyst and the solvents removed at reduced pressure to give 113 g of (3-chloropropyl)-2,4-diaminobenzoate, a white solid, mp 97° C.

A mixture of 35 ml of toluene, 4.6 g of (3-chloropropyl)-2,4-diaminobenzoate and 3.5 g of morpholine was refluxed for 10 hrs, cooled to room temperature, and poured into 70 ml of water with stirring. The precipitate was filtered, washed with hexane and dried. Recrystallization from toluene gave 2.6 g (3-morpholinopropyl)-2,4-diaminobenzoate, a white solid, mp 96° C.

The following amino esters are obtained in an analogous manner.
(3-(N-methylpiperazino)propyl)-2,4-diaminobenzoate: mp 72°-74° C.
(3-bis(N,N-dimethylaminopropyl)aminopropyl)-2,4-diaminobenzoate: oil

EXAMPLE 2

Preparation of Non-catalytic Diaminobenzoate

To a mixture of 212.0 g of 2,4-dinitrobenzoic acid in 300 ml of toluene were added 4.0 g of toluenesulfonic acid and 180.2 g of 1-methoxy-2-propanol. The mixture was refluxed for 48 hrs and the resulting water removed by azeotropic distillation. After this period the mixture was cooled to room temperature and washed with 500 ml of an aqueous 5% NaHCO₃ solution followed by two 150 ml water washings. The toluene was removed at reduced pressure and the resulting oil was washed with hexane to give 152 g (1-methoxy-2-propyl)-2,4-dinitrobenzoate, a tan solid, mp 42° C.

A 500 ml Parr Shaker was charged with 75.6 g of (1-methoxy-2-propyl)-2,4-dinitrobenzoate, 200 ml methanol, and 1.5 g of a 5% palladium on carbon/50% water catalyst. The mixture was hydrogenated at 50 psi hydrogen pressure while maintaining the temperature below 50° C. Hydrogen uptake ceased after 4 hrs. The mixture was cooled, filtered, and the methanol removed under reduced pressure to give 56 g of (1-methoxy-2-propyl)-2,4-diaminobenzoate, a brown viscous liquid.

EXAMPLE 3

Preparation of Non-catalytic Diaminobenzoate

To a mixture of 212 g of 2,4-dinitrobenzoic acid in 300 ml of toluene were added 38 g of concentrated sulfuric acid and 230 ml of isobutyl alcohol. The mixture was refluxed for 10 hrs and the resulting water removed by azeotropic distillation. After this period the mixture was cooled to room temperature and washed with 1000 ml of an aqueous 5% NaHCO₃ solution followed by two 500 ml water washings. The toluene was removed at reduced pressure and the resulting dark oil was washed with hexane to yield 252 g of isobutyl-2,4-diaminobenzoate, a fluffy white crystalline solid, mp 54°-55° C.

A 500 ml Parr Shaker was charged with 80.0 g of isobutyl-2,4-dinitrobenzoate, 200 ml methanol, and 3.0 g of a 5% palladium on carbon/50% water catalyst. The mixture was hydrogenated at 50 psi hydrogen pressure while maintaining the temperature below 50° C. Hydrogen uptake cease after 4 hrs. The mixture was cooled, filtered and the methanol removed under reduced pressure. The remaining solid was washed with toluene, filtered and dried to give 50.7 g of isobutyl-2,4-diaminobenzoate, a light tan solid, mp 89° C.

EXAMPLE 4

Reactivity of Polyurethane Formulations Using Catalytic and Non-Catalytic Diaminobenzoate Curing Agents Chain extender activity is measured using a Polyair polyurethane rheometer in a representative formulation consisting of two equivalents of toluene diisocyanate prepolymer, one equivalent of polyester diol and one equivalent of aromatic diamine. The isocyanate prepolymer is Adiprene 167, a TDI-terminated 1000 molecular weight polytetramethyleneglycol available from Uniroyal. The diol is CAPA 200 from Interox, a polycaprolactone of 274 equivalent weight.

Aromatic diamine is dissolved in an isoequivalent of CAPA 200. Solid amines are melted under a protective nitrogen blanket, then mixed, to hasten dissolution. The amine/polyol blend is checked for homogeneity and stability at 50° C., then the correct weight is placed in a 35 mm deep, 20 mm i.d. cylindrical stainless steel cup. Alternatively, exact weights of amine and diol are added directly to the test cup instead of being made in a master batch. The correct weight of Adiprene 167 thermostatted at 50° C. is carefully layered above the diol/diamine. The test cup is inserted into a thermostatted block, also maintained at 50° C. Total weight of the 2:1:1 NCO prepolymer:diol:diamine mixture is 7.0 g.

Above the test cup in the polyurethane rheometer is a close fitting (19.5 mm o.d.) perforated plunger mounted by a removable key on a shaft driven at a constant pressure by a reciprocating air motor. The plunger base is 6 mm thick with six radially distributed 2 mm holes extending through the base. At full stroke the plunger reaches the cup bottom; at the upper limit a teflon seal retains material in the cup. A series of 'O' rings cleans the shaft of formulation on each upstroke.

As each new plunger is mounted, its stroke rate is checked and calibrated against 'O' ring resistance. The normal set point is a 5 Hz stroke rate in an empty cup which requires approximately 20 pounds pressure. Shaft movement is detected by magnetic sense switches at the top and bottom of the rheometer shaft and compared to a (Global Specialties Corp. model 4401) 1000 Hz frequency standard using a 24 Kb Ohio Scientific C4PMF 8 bit microcomputer.

The reactivity test is started by triggering the pressure driven plunger using a contact switch which also starts a floppy disc-based operating program. As the components react, the formulation viscosity increases causing the shaft stroke rate to decrease. Time and computed relative viscosity, normalized to the 200 millisecond cycle time for a specific plunger, are displayed on a CRT monitor in real time and stored in microcomputer memory. Relative viscosity units may be correlated to actual viscosities by extended calibration.

In a test run individual cycles are first timed, averaged over a minimum period ($T_{min}$) and accumulated. After 80 data points have been recorded the array holding the data is compressed to 40 points and $T_{min}$ is doubled. This continues until the device is stopped or disabled by a program interrupt. BASIC software allows X-Y plotting of time-relative viscosity on the microcomputer CRT and assignment of run information such as sample name and notebook number. After each rheometer run, data are transferred via the Ohio Scientific RS-232 printer port to a PDP 11/44 minicomputer. Graphics displaying multiple run time-relative viscosity data may be produced on a lab VT-100 minicomputer terminal. A final level of data transmission occurs between the minicomputer and corporate mainframe from which numerical lineshape analyses and graphics are generated.

A polynomial exponential model was chosen to best calculate rheometer lineshapes:

$$\text{relative viscosity} = e^{(I + A^*t + B^*t^2 + C^*t^3)}$$

The first order term, "A", measures initial reactivity. The higher order terms describe the more complex buildup of cohesive forces in the final polymer. T/5000, the time at which the relative viscosity is 5000 units, is a single valued potlife time that provides succinct, though only partial reactivity comparisons among chain extenders in a specific test formulation.

Pot-life test results for catalytic benzoates are given in Table I below. T/5000 values illustrate the increase the reactivity that results from incorporation of tertiary amine functionality into the side chain. The ester series, 1-4, shows roughly an order of magnitude increase in reactivity for each tertiary amine incorporated into the side chain. Reactivity data for the 2,4-diaminobenzoic acid ester of 3-methoxy-2-propanol, 5, has been included as an example of a non-catalytic diamine chain extender. Ether functionality in the ester sidechain of this molecule improves polyol solubility.

The tertiary amine-containing aromatic diamine catalysis for the PUR-urea formulation may be compared with classic free tertiary amine catalysts. Addition of one equivalent of triethylamine to isobutyl-2,4-diaminobenzoate decreases T/5000 from 151 min to 1.2 min, while addition of one equivalent of triethylenediamine decreases it to 0.39 min.

TABLE 1

| Compound No. | Chain Substitution on Benzoate | T/5000 (min) |
|---|---|---|
| 1 | —O(CH$_2$)$_3$Cl | 133. |
| 2 | —O(CH$_2$)$_3$N(morpholine) | 15.4 |
| 3 | —O(CH$_2$)$_3$N(N-methylpiperazine) | 1.63 |
| 4 | —O(CH$_2$)$_3$N(CH$_2$CH$_2$CH$_2$N(CH$_3$)$_2$)$_2$ | 0.63 |
| 5 | —OCH(CH$_3$)CH$_2$CH$_2$OCH$_3$ | 184. |
| 6 | —OCH$_2$CH(CH$_3$)$_2$ | 151. |
| 7 | —OCH$_2$CH(CH$_3$)$_2$ + TEA | 1.38 |
| 8 | —OCH$_2$CH(CH$_3$)$_2$ + TEDA | 0.39 |

FIG. 1 illustrates the rheological data for compounds 1, 2, 3 and 4. FIG. 2 illustrates the rheological data for compounds 6, 7 and 8.

The tertiary amine portion of the molecule, while acting as a polyurethane catalyst, is bound to the polymer network which allows for adequate polymer cure while prohibiting later diffusion of the catalytic species from the foam. Odor and toxicity are therefore eliminated as problems. The aromatic diamine provides enhanced PUR physical properties.

The tertiary amine catalyst is chemically bound to an aromatic diamine chain extender which is incorporated into the polymer chain. Unlike other tertiary amine catalysts which are bound to the polymer network by an isocyanate reactive group, these catalysts are chain extenders, not chain terminators or crosslinkers.

The present invention has been described with reference to specific embodiments thereof. However, these embodiments should not be considered a limitation on the scope of the invention, such scope should be ascertained by the following claims.

We claim:

1. In a process for the preparation of a polyurethane composition by reacting a polyisocyanate with a polyol, a chain extender and a catalyst, the improvement which comprises reacting a catalytic chain extender comprising a diaminobenzoate having a tertiary amine functionality incorporated into a side chain of the diaminobenzoate.

2. The process of claim 1 wherein said diaminobenzoate having a tertiary amine functionality incorporated into a side chain of the diaminobenzoate is represented by the general formula:

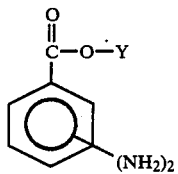

wherein:
Y=

$$-R_1-\overset{R_2}{\underset{|}{N}}-R_3, \quad -R_1-N-(R_4-\overset{R_2}{\underset{|}{N}}-R_3)_2,$$

$$-R_1-N-(R_1-O-R_5-\overset{R_2}{\underset{|}{N}}-R_3)_2,$$

$$-R_1-\overset{R_2}{\underset{|}{N}}-R_4-\overset{R_2}{\underset{|}{N}}-R_3,$$

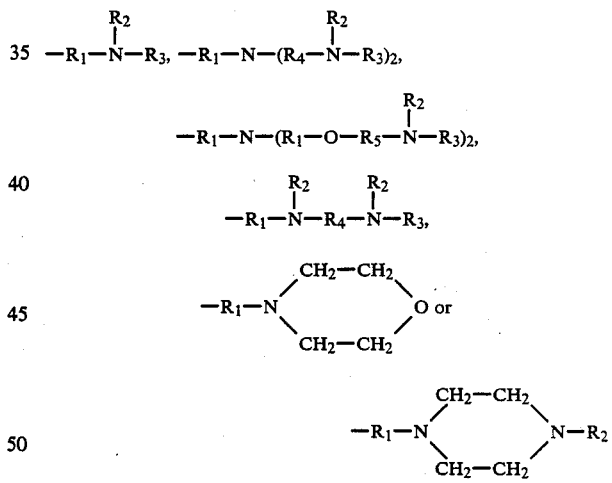

and
R$_1$=(CH$_2$)$_n$, n=2–5
R$_2$, R$_3$, =C$_{1-4}$ alkyl or C$_{2-6}$ alkoxyalkyl
R$_4$=C$_{3-9}$ alkyl and
R$_5$=C$_{1-4}$ alkyl.

3. The process of claim 1 wherein said aromatic diamine is selected from the group consisting of (3-(morpholino)propyl)-diaminobenzoate, (3-(N-methylpiperazino)propyl)-diaminobenzoate, (3-(bis(N,N-dimethylaminopropyl)amino)propyl)-diaminobenzoate, (2-(morpholino)ethyl)-diaminobenzoate, (2-(N-methylpiperazino)ethyl)-diaminobenzoate, (2-(bis(N,N-dimethylaminopropyl)amino)ethyl-diaminobenzoate, (3-(dimethylamino)propyl)-diaminobenzoate, (2-(dimethylamino)ethyl)-diaminobenzoate, (3-(diethylamino)propyl)-diaminobenzoate, (3-(di-n-propylamino)- propyl)-diaminobenzoate, (2-(di-n-propylamino)ethyl)-diaminobenzoate, (3-(diisopropylamino)propyl)-diaminobenzoate, (2-(diisopropylamino)ethyl)-diaminobenzoate, (3-(methylethylamino)propyl)-diaminobenzoate, (2-(methylethylamino)ethyl)-diaminobenzoate, (3-(di-n-butylamino)propyl)-diaminobenzoate, (2-(di-n-butylamino)ethyl)-diaminobenzoate, (3-(methyl-n-propylamino)propyl)-diaminobenzoate, (2-(methyl-n-propylamino)ethyl)-diaminobenzoate, (3-(methylisopropylamino)propyl)-diaminobenzoate, (2-(methylisopropylamino)ethyl)-diaminobenzoate, (3-(methyl-n-butylamino)propyl)-diaminobenzoate, (2-(methyl-n-butylamino)ethyl)-diaminobenzoate, (3-(methyl-sec-butylamino)propyl)-diaminobenzoate, (2-(methyl-sec-butylamino)ethyl)-diaminobenzoate, (3-(ethylisobutylamino)propyl)-diaminobenzoate, (2-(ethylisobutylamino)ethyl)-diaminobenzoate, (3-(dicyclohexylamino)propyl)-diaminobenzoate, (2-(dicyclohexylamino)ethyl)-diaminobenzoate, (3-(N-methylcyclohexylamino)-propyl)-diaminobenzoate, (2-(N-methylcyclohexylamino)ethyl)-diamino-benzoate, (3-(N-(2-(methoxyethyl)piperazino)propyl)-diaminobenzoate, (2-(N-(2-(methoxyethyl)piperazino)ethyl)-diaminobenzoate, and mixtures thereof, and wherein the diaminobenzoate is selected from the group consisting of 2,3; 2,4; 2,6; 3,4; 3,5 isomers and mixtures thereof.

4. A polyurethane composition obtained by reacting a polyisocyanate, a polyol and a catalytic chain extender wherein the catalytic chain extender comprises a diaminobenzoate having a tertiary amine functionality incorporated into a side chain of the diaminobenzoate represented by the general formula:

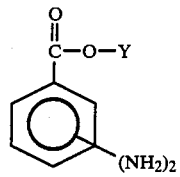

wherein:
Y=

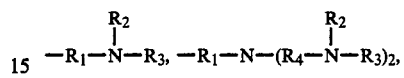

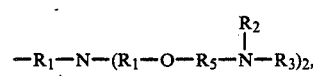

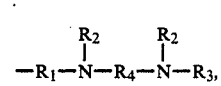

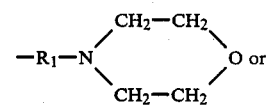

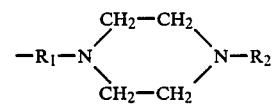

and
$R_1 = (CH_2)_n$, n=2-5
$R_2$, $R_3$, = $C_{1-4}$ alkyl or $C_{2-6}$ alkoxyalkyl
$R_4 = C_{3-9}$ alkyl and
$R_5 = C_{1-4}$ alkyl.

* * * * *